United States Patent [19]
Klimek et al.

[11] 4,453,300
[45] Jun. 12, 1984

[54] METHOD OF MANUFACTURING A SWASH PLATE ASSEMBLY

[75] Inventors: Edmund J. Klimek, Arlington Heights; Richard W. Roberts, Lombard, both of Ill.

[73] Assignee: Borg-Warner Corporation, Chicago, Ill.

[21] Appl. No.: 360,521

[22] Filed: Mar. 22, 1982

[51] Int. Cl.³ .............................................. B23P 15/00
[52] U.S. Cl. ............................... 29/156.4 R; 29/149.5 B; 29/441 R; 29/156.5 A; 29/469; 164/75; 164/100; 164/111; 164/112; 264/242; 264/278
[58] Field of Search ............... 29/469, 458, 527.5, 29/156.5 A, 149.5 B, 149.5 R; 74/579 R; 219/60.2, 61, 121 LC, 121 LD, 121 EC, 121 ED; 164/111, 112, 75, 100, 101; 264/242, 278

[56] References Cited

U.S. PATENT DOCUMENTS

| | | | |
|---|---|---|---|
| 1,306,639 | 6/1919 | Soemer | 123/58 BA |
| 1,548,382 | 8/1925 | Paul | 403/25 |
| 2,107,795 | 8/1938 | Larsh | 92/187 |
| 2,252,351 | 8/1941 | Paulus | 29/149.5 B |
| 2,361,046 | 10/1944 | Molley | 74/579 X |
| 2,919,150 | 12/1959 | Baker | 403/27 |
| 3,205,027 | 9/1965 | Hilton | 384/203 |
| 3,241,777 | 3/1966 | Kuntz | 241/300 |
| 3,314,127 | 4/1967 | Acuff et al. | 29/149.5 B |
| 3,570,090 | 3/1971 | Teramachi | 29/149.5 B |
| 3,583,050 | 6/1971 | Teramachi | 29/149.5 B |
| 3,629,921 | 12/1971 | Davies et al. | 29/149.5 B |
| 3,739,133 | 6/1973 | Kadley et al. | 219/60.2 X |
| 3,763,535 | 10/1973 | Gallagher | 29/149.5 B |
| 3,769,489 | 10/1973 | Charlesworth | 219/60.2 |
| 3,786,543 | 1/1974 | Sato | 29/149.5 B |
| 3,907,959 | 9/1975 | Wise et al. | 264/242 |
| 3,949,186 | 4/1976 | Nakayama et al. | 219/121 ED |
| 3,952,395 | 4/1976 | Crossman et al. | 29/520 X |
| 4,161,055 | 7/1979 | Weremijenko | 29/149.5 B |
| 4,179,313 | 12/1979 | Koch et al. | 148/3 |
| 4,221,263 | 9/1980 | Meyer | 219/60.2 X |
| 4,225,772 | 9/1980 | Bacha | 219/60.2 X |
| 4,264,801 | 4/1981 | Itabashi | 219/60.2 X |
| 4,270,255 | 6/1981 | Klimek | 29/156.5 A |
| 4,365,136 | 12/1982 | Gottlieb | 219/121 LD |

FOREIGN PATENT DOCUMENTS

| | | | |
|---|---|---|---|
| 642702 | 3/1937 | Fed. Rep. of Germany | 29/156.5 A |
| 2403864 | 5/1979 | France | 29/156.5 A |

OTHER PUBLICATIONS

American Society for Metals; Metals Handbook, 8th Edition; vol. 6, Welding and Brazing; pp. 113–137, 519–564.

Primary Examiner—Charlie T. Moon
Assistant Examiner—R. S. Wallace
Attorney, Agent, or Firm—Florian S. Gregorczyk

[57] ABSTRACT

An improved method of manufacturing a swash plate assembly for use in a compressor, fluid motor or similar device in which a plurality of pistons are connected, by means of connecting rods, to a swash plate which drives (or is driven by) the pistons. A plurality of piston assemblies are made by casting the piston around one end of a connecting rod section which is formed with a ball thus providing a ball-socket connection therebetween. Mating spherical ends with through-bores to receive the piston connecting rod section are cast-in-place and captured in sockets within the swash plate. The connecting rod section of the pistons is mated to the through-bores of the mating spherical ends and are positioned in an appropriate fixture to a fixed final relationship. The connecting rod sections are secured to the sidewall of each through-bore by a means such as electron-beam welding to secure the overall length of the final assembly.

2 Claims, 7 Drawing Figures

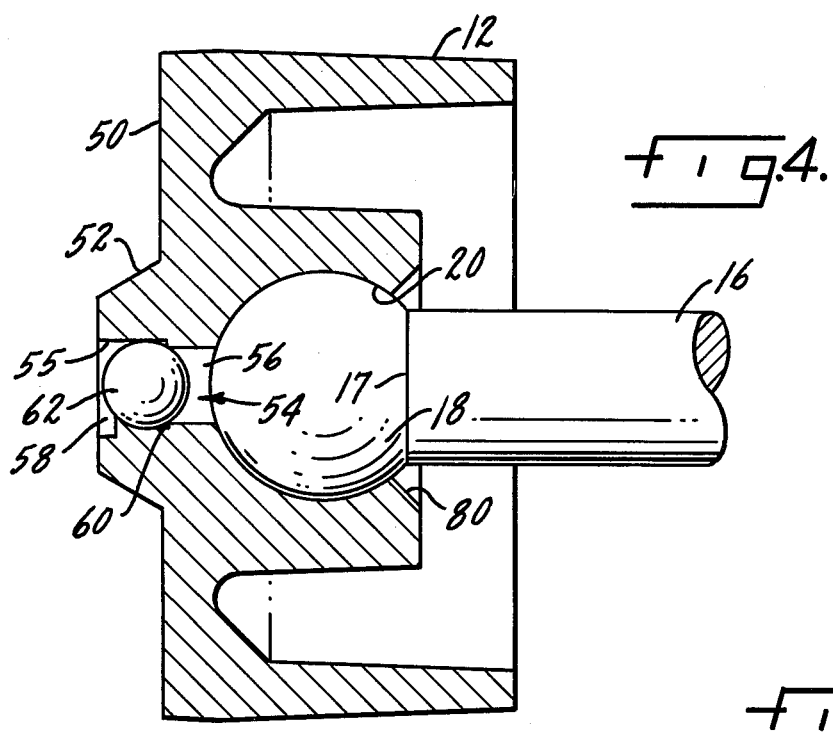
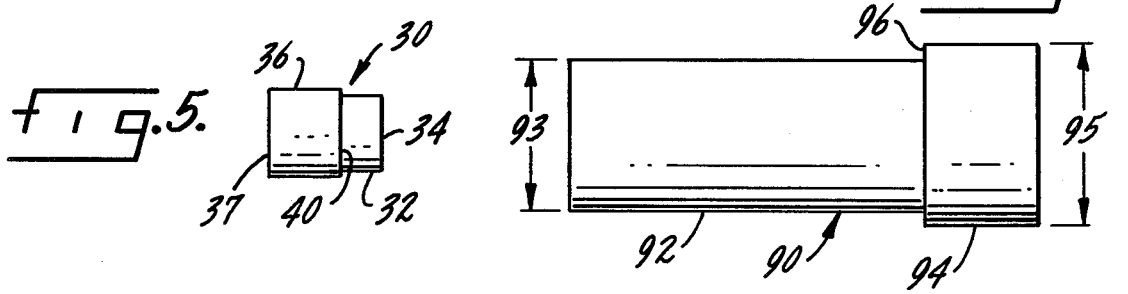
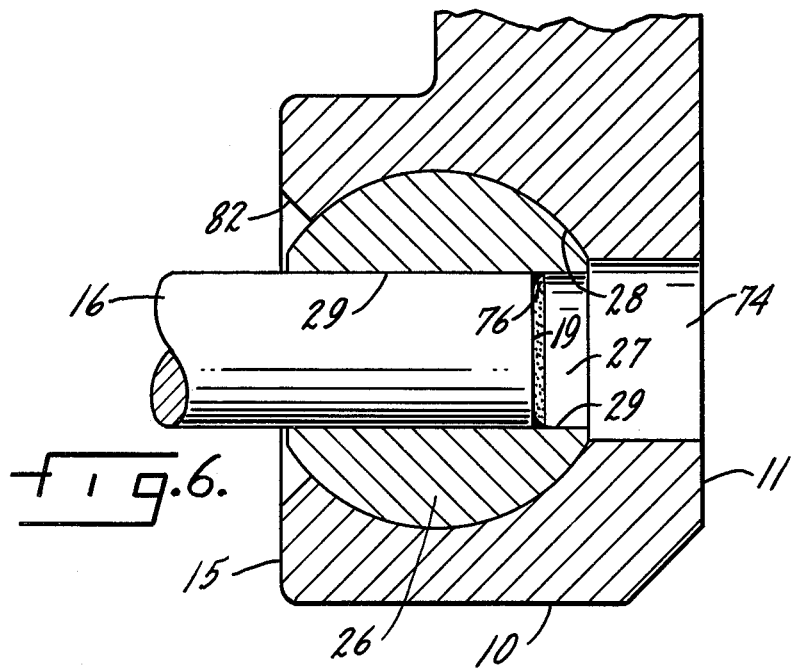

METHOD OF MANUFACTURING A SWASH PLATE ASSEMBLY

BACKGROUND OF THE INVENTION

1. Field of the Invention

A method of manufacturing a compressor or fluid motor generally classified in Class 29, Subclass 156.4R.

2. Description of the Prior Art

U.S. Pat. No. 1,548,382 (J. A. Paul) discloses a piston and connecting rod connection which permits adjustment between the crown of the piston and the center line of the bearing engaging the crankshaft. This patent does not disclose the cast-in-place technique for either the piston to connecting rod joint, or the connecting rod to swash plate joint, and further does not even disclose a swash plate.

U.S. Pat. No. 2,107,795 (E. P. Larsh) discloses a two piece connecting rod in which the portion of the rod connected to the piston comprises a tube which fits telescopically over a shank portion of the connecting rod bearing section. This disclosure is has the same shortcomings as the Paul patent.

U.S. Pat. No. 2,252,351 (W. Paulus) is one of the earliest disclosures of a cast-in-plate technique for forming a ball and socket connection between two parts.

U.S. Pat. No. 3,763,535 (Gallagher) is directed to a method of forming a ball and socket connection between a connecting rod and a piston. The purported novelty concerns the use of a selected pressure for the molten material introduced into the mold cavity during the die casting process.

3. Additional Background Description

In the past ball and socket assemblies are used extensively to allow combinations of axial, rotational and orbital movements in machinery. Such machinery components include pistons, drive plates and crank shafts in pumps and compressors, actuating toggles for presses and punches, connecting rods and assemblies in conveyor systems. These components are eminently suitable for use in swash plate assemblies, such as the assembly of this invention.

Depending on the accuracy and/or strength required of the ball and socket joint, there are several methods for constructing the assembly. For example, a round aperture with a spherical bottom can be machined into the socket member. This requires accurate and expensive tooling. After the ball with its stem or other attachment is placed into the aperture, the wall of the aperture must be made to enclose the ball to retain it in the socket during its motion. The enclosing can be accomplished by rolling, swaging, pressing, spinning or any other suitable metal deforming process where the aperture wall is deformed to conform around the ball to the degree required for strength of the joint and to allow the required freedom of movement. Each of these presently used enclosing procedures is a separate operation in manufacture of the assembly. The procedure selected depends on economy, degree of accuracy or tightness required of the joint, and also on the materials of construction of both ball and socket.

To produce strong assemblies, capable of withstanding repeated heavy loads or to produce precise assemblies with a controlled or minimum movement or "play" between the ball and socket, a maximum amount of comformity of the ball to socket must be achieved. This high degree of conformity requires large deformations of the socket material which requires more time consuming and expensive procedures and equipment. The maximum "fit" also demands a large degree of deformation of the socket material which may require the use of soft, weak material by necessity, but which may still result in cracking or stresses that act to further weaken the assembly.

The high pressures required to deform the walls of the aperture to conform to the ball imposes the requirement that the ball be made of a high strength material that will resist crushing during forming. This limits the selection of ball materials with possible penalties in desired properties or economy.

Aside from the problems cited above, the high pressures of forming do not assure full socket conformity to the spherical surface of the ball. As a result of incomplete forming, and also because of wrinkling and buckling of the deformed materials, the applied loads are not uniformly distributed over the spherical surface of the ball. This results in concentrated loads which cause overloading and failure. Such load concentrations also cause excessive wear on the contact points, which increases the amount of relative movement in the socket and thus complicates loading, leading to premature failure.

Any and all of the methods of assembling the ball to the socket are such that precise dimensions of the assembly cannot be maintained. In many applications, two or more ball socket joints are connected to form the piece of machinery. Final dimensioning of the apparatus must be performed by machining of the unwieldy assembly.

In many of the mechanical forming processes, a spacer material or coating is applied on either the ball or on both components, to assure that some, or a specified amount, of relative movement will exist between the components. Such "spacers" must be removed by dissolving, heating or mechanical means.

Other methods of forming the ball socket assembly include the use of wires, rods or pins which prevent the escape of the ball from the socket. These require secondary operations to fix the retainer to the socket body. Another method would be to machine spherical apertures into two separate sections, and then connect the separate sections after enclosing the ball. The connecting could be by fasteners, springs, brazing, etc.

SUMMARY OF THE INVENTION

The invention relates to a new and improved method of manufacturing a piston assembly for a swash plate in a swash plate and piston assembly. A plurality of pistons are connected to a swash plate such that axial motion is transmitted to the pistons by the nutating motion of the swash plate. When the assembly is used in a fluid motor, the reciprocating motion of the pistons drives the swash plate.

The basic manufacturing steps include: (1) fabricating a plurality of piston subassemblies, each of which is made by providing a connecting rod section with one end thereof formed with a substantially spherical surface, and then die casting a piston so that the spherical surface is cast in a complementary socket to form a ball/socket connection; (2) sealing a cast opening in the crown of the piston to prevent a fluid bypass therethrough and to minimize a dead space above the piston; (3) providing a plurality of spherical surfaces which define diametral through-bores and which are mounted on locating pins in the throughbores; (4) die casting a swash plate such that the spherical surfaces are captured in a complementary socket to form ball/socket connections between said swash plate and said spherical surface; (5) finish machining the piston and rod assemblies and swash plate and spherical surface assemblies; (6) supporting said pistons at a fixed position relative to said swash plate; (7) sliding said connecting rods into a mating through-bore to thereby independently fix the specified distance between said piston head surface and said swash plate; and (8) joining each connecting rod in each through bore to the through-bore wall.

DESCRIPTION OF THE DRAWINGS

FIG. 4 is a detailed cross section view of a piston subassembly;

FIG. 5 is a detailed side view of a stepped locating pin; and

FIG. 6 is a cross section view of a through-bored spherical element in a socket of a swash plate.

FIG. 7 is a side view of a second stepped locating pin.

DETAILED DESCRIPTION OF THE INVENTION

A preferred method for manufacture of ball and socket junctions includes the technique of inserting the ball and its appendages during manufacture of the socket by molding of liquid, superplastic or powdered metals or polymeric compounds, and preferably by die casting of molten metal, such as aluminum.

The pistons of a variable displacement pump, compressor or fluid motor are attached to a driving plate by connecting rods. The movement of both the pistons and drive plate require the flexibility of a ball-socket junction. The assembly can contain a multiple number of pistons attached to the swash plate. The pistons must be machined for dimensions, contour and ring grooves on the outer diameter and top surfaces. On the other hand, the swash plate must be machined on the bottom and inner diameter surfaces for contour and flatness. The final assembly of pistons and swash plate must be dimensioned to a tolerance of 0.001"–0.002" in final length.

Figure 1:
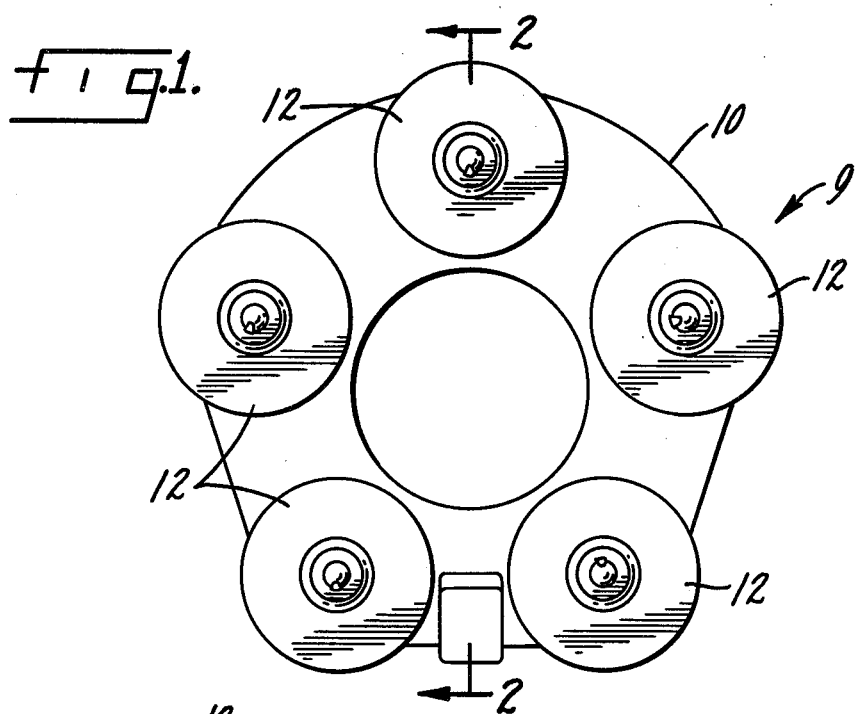
FIG. 1 is a plan view of a swash plate assembly constructed in accordance with the principles of the present invention.
Figure 2:
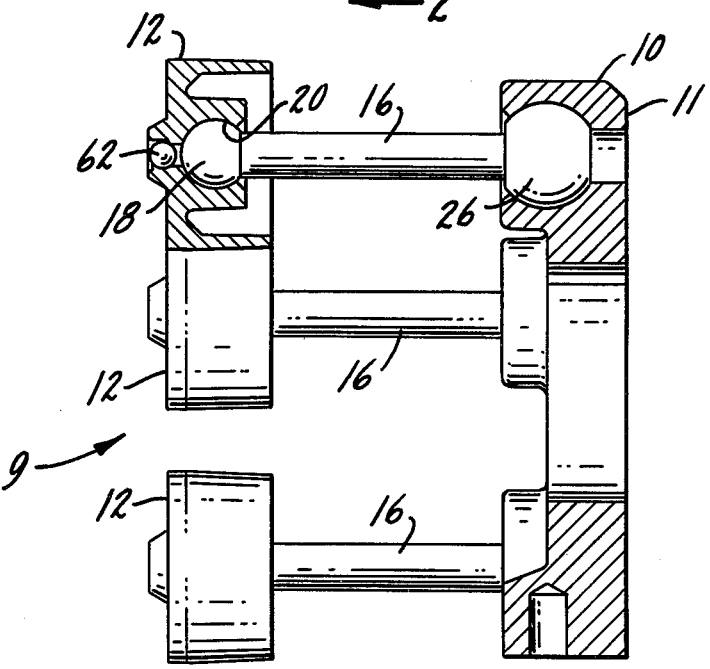
FIG. 2 is a cross section view taken along the plane of line 2—2 of FIG. 1.
Figure 3:
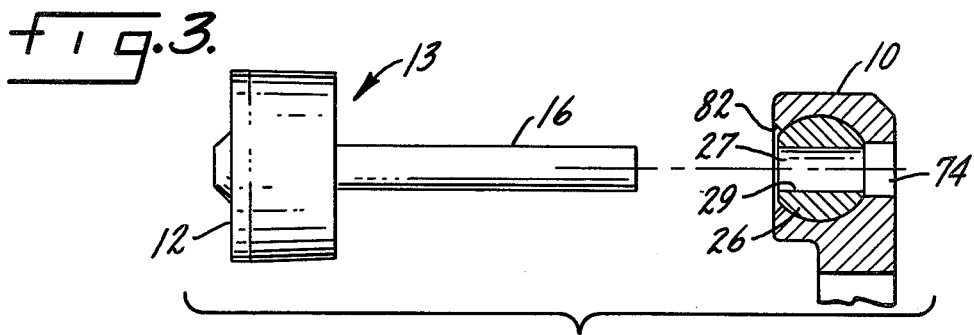
FIG. 3 is an exploded assembly drawing illustrating the relationship of the piston subassembly and the swash plate subassembly prior to being secured to one another.

Referring to FIGS. 1 and 2 of the drawings, the swash plate assembly 9 is formed of a swash plate 10 and a plurality of pistons 12 with connecting rods 16 to produce subassemblies 13 extending between the pistons and swash plate. Each connecting rod 16 is made up of a central rod or cylindrical section having a first spherical end or surface 18 (FIG. 4) which is captured in a socket 20 formed in the base of a piston 12. Central rod 16 is a generally straight, cylindrically-shaped section either hollow or solid. Section 16 has a second ball-shaped end (FIG. 6), in effect, as the cylindrical rod is received in a mating through-bore 27 with a side wall 29 of a spherical end member or ball 26. The ball-shaped end 26 is captured in a complementary socket 28 in swash plate 10, to form a ball and socket connection between connecting rod section 16 and swash plate 10.

The preferred procedure for manufacturing the swash plate assembly is as follows:

1. Steel ball 18 is joined to a section 16 of hollow tubing or solid rod. The tubing or rod 16 has first and second ends 17, 19 and is at least ¼" longer than the finished assembly distance from steel ball 18 to spherical end member 26 or front face 15 of swash plate 10, but at least ¼" less than the distance to base surface 11, the rear surface of swash plate 10, or the surface farther from pistons 12. The ball and stem assembly so formed is coated with a mold release agent and then may be heated to 300° to 400° F. to drive off any volatiles in the coating, to preheat the ball and to stress relieve the weld or other means by which the ball and rod were joined.

2. The coated, preheated ball and stem are placed into the cavity of a die casting machine. One suitable machine is that illustrated and described in U.S. Pat. No. 3,763,535. The mold has a stepped locating pin 30 such as that shown in FIG. 5 to this application. Pin 30 has a first cylindrical section 32, a first end surface 34, a second cylindrical section 36 is greater in diameter than the first section 32, and a second end surface 37. A step or shoulder 40 is defined at the juncture of sections 32 and 36. The steel ball end 18 with rod section 16 is secured against first end 34 of locating pin 30 in the die casting machine to maintain the ball and rod 14 in position during casting. Pin 30 and sections 32, 36 are of specified lengths and diameters to secure ball end 18 and yield a stepped port of fixed diameters and lengths. The mold is closed and a casting made as per conventional die casting procedures.

3. The solidified casting is ejected from the mold and locating pin 30, or the locating pin 30 may be removed after mold ejection. Piston 12 as shown in FIG. 4 defines a piston top surface 50, a crown 52 centrally located thereon and a stepped port 54 with sidewall 55 communicating between surface 50 and socket 20. Stepped port 54 is preferably cylindrical and includes a first segment 56, a second segment 58 with a larger cross-sectional diameter, and port 54 has a shoulder or step 60 at the juncture of segments 56 and 58.

4. A steel ball 62 is positioned against shoulder 60 and retained by any means known in the art, such as staking, to seal communication through stepped port 54. The piston is thereafter machined to final dimensions.

5. The swash plate 10 is produced by inserting the required number of coated and, in some cases, preheated balls 26, each defining a diametral through-bore 27 with side wall 29 whose cross section is about the diameter of rod section 16 and able to receive the rod 16 therein, onto a generally cylindrical second locating pin 90 of FIG. 7 which defines a first cylindrical section 92 having a first diameter 93 about the diameter of rod 16 a second cylindrical section 94 with a diameter 95 greater than first diameter 93. The intersection of first and second diameters 93, 95 define shoulder 96. The length of first cylindrical section 92 is such that it will protrude beyond ball 26 when they are mated. Second cylindrical section is of a length that extends into the die cavity a distance adequate to define a port in the swash plate 10. The ball 26 is positioned against shoulder 96 in the die cavity and the casting is poured and ejected. The swash plate casting is machined to final dimensions. Swash plate 10 defines port 74 communicating between base surface 11 and complementary socket 28.

6. The piston and swash plate subassemblies are placed into a fixture (not shown) after a length of each rod 16 is positioned in a mating bore 27 of the spherical ball 26. This fixture holds all of the components, that is, the pistons and swash plate, in proper axial position for joining the connecting rods to sidewall 29 in through bores 27, and the fixture also fixes the total length of the assembly to within required dimensions prior to joining.

7. The male/female junction in the throughbores 27 of spherical elements 26 are joined together as at 76 in FIG. 6 to complete the assembly by means known in the art such as election beam welding, TIG welding or laser beam welding.

As examples of specific variations of materials and processes referred to above and to illustrate the scope of the method without limiting the method to the examples, the manufacture of the assembly could be performed by several variations. For example, the materials of construction and method of manufacture of the balls can be of any type as currently available or practiced or of any special type as needed for a particular application. These special properties could include strength, wear or corrosion resistance or magnetic properties. As example, hard or soft steel, cast irons, copper or aluminum base alloys or nonmetallic balls could be used as desired for properties or economy.

The ball 18 can be attached to the connecting rod section or any appendage by soldering, brazing, resistance or fusion welding, adhesives or by mechanical means such as screw threads.

The connecting rod section or any appendage can be made of any material by any process to provide the properties and/or economy required of the assembly. As example, the assembly configuration could be produced by cold heading, swaging, machining, casting or any process known to be used in the shaping of materials. The connecting rods could be made of solid rod or bar, or tubing. Regardless of method of manufacture, the end of the connecting rod should be such that it can be easily mated and axially movable in bore 27 for final dimensioning.

The coating applied to the ball section prior to molding into the socket could be of a variety of materials and thicknesses as required for properties and economy or to be compatible with the process or materials selected for ball-socket manufacture. As an example, hardened steel balls as used for ball bearings, resistance welded to low carbon steel tubing are coated by dipping or spraying with an alcohol dispersion of finely divided graphite. On drying at 400° F. for sufficient time to evaporate all of the alcohol, heat the entireball-stem and stress relieve the weld, the ball will be coated with a film of graphite. Similar suspensions in water, alcohols or other suspending mediums could be used to deposit films of molybdenum disulfide or other solid lubricants. The coating could be produced by dipping or spraying of polymeric materials of the polyethylene or polybutadiene types which will carbonize without producing large volumes of vapor upon contact with the liquid metal or any source of high temperature to provide a separating film between the ball and socket to assure free motion. Such coatings can also be air dried at room temperature.

The coating material prevents the sticking of the ball and socket materials by producing an interference film between the two. The thickness of the interference film can be controlled by formulation or by repeated coating to provide a positive or specified clearance as required. Ideally, the coating material would also serve as a lubricant or initial wear-in component in the system as with graphite or carbonized polymer coatings. The selection of the coating material will be dependent on the variables of the assembly including materials, molding process, service conditions, etc. As an example, a steel ball molded in an aluminum powder compact socket could be coated with a phosphate conversion coating for separation and initial wear-in.

The degree of preheating of the coated ball will be determined by several factors of the coating and molding process itself. As example, volatile binders and vehicles in the coating must be driven off to prevent large quantities of gas in the mold during molding. The degree of preheat of the insert will also be selected to promote soundness and strength and the amount of shrinkage of the liquid metal cast around the insert.

Several methods are available to those familiar with the art, for securely holding inserts in place during molding of liquid or powdered metals and polymers. These could include adhesives, springs, magnets, and vacuum. A core pin such as pin 30 or 90 in the molding equipment could serve the dual purpose of holding the insert in place and also provide an orifice for lubrication of the socket. Such a core pin 30, 90 retains the socket 26 and ball 18 in the present example to secure them in position against the mating mold segments to provide against shifting of such inserts during casting and to thus preserve clearance annuli 80 and 82 in piston 12 and swash plate socket 28, respectively. However, such an orifice is unacceptable for use where an elevated pressure is required and thus must be sealed as shown in FIG. 4.

The molding process for forming the socket would be selected based on considerations of materials, special properties, availabilities or economy as required for the type and number of parts being produced. As example, the die casting process mentioned in the example for producing pistons and drive plates was selected on the basis of production quantities (economy) and the type of material required in the piston and plate. The two parts here could be made of aluminum alloy #380. Any other aluminum base alloy compatible with the die casting process and with the required chemical and mechanical properties of the part could be used. Magnesium and zinc based die casting alloys could be used if economy or property requirements allow or demand. Based on the considerations above, any other metal casting process could be used.

The design of the socket is not necessarily limited to containment about the entire periphery of the ball but could be partially slotted to allow greater travel in one or more directions.

Socket manufacture encompassing the present method need not be limited to metals or the casting of liquid metals. The ball inserts as described can be contained in compacted metal powders and processed in the manner known to those familiar with the art for treating metal powder compacts to achieve required properties. The socket could be manufactured by molding or casting of polymeric materials according to procedures well known to those familiar with the art.

The design or function of the socket is not limited to the piston and drive ring used here as example but could be of any shape required.

The final assembly of the two or more socket assemblies is accomplished by joining the preformed connecting rod sections with ball 26. As example, for assembly of multiple pistons to a swash plate, the finish machined pistons are fed into a holding fixture which also locates the free moving sections of connecting rods. The drive plate is held in a similar fixture to align its free moving balls and through bores with the mating ends of the piston rods. The two assemblies are moved together to affect the required final dimension from bottom of the drive plate to top of the pistons. The ends of the unassembled connecting rod sections freely allow lateral movement. Once the proper dimension is achieved, the holding fixtures are fixed, and the ends of the connecting rods are joined by an electron beam weld in each bore. Either multiple welding heads, rotation of holding fixtures or welding head can be utilized to complete all welds as determined by production considerations.

While this invention has been described in connection with certain specific embodiments thereof, it is to be understood that this is by way of illustration and not by way of limitation; and the scope of the appended claims should be construed as broadly as the prior art will permit.

What is claimed is:

1. The method of manufacturing a swash plate assembly, comprising the steps of:
   (1) fabricating a plurality of piston subassemblies, each of which is made by (a) providing a connecting rod section with a first and second end with a substantially spherical surface formed on said first end; (b) positioning said spherical surface against a stepped locating pin end in a die casting mold to secure said spherical surface and connecting rod in said mold; (c) die casting a piston in said mold about said locating pin such that a portion of the piston captures said spherical surface in a complementary socket to form a ball/socket connection and where said piston further defines a stepped port formed about said locating pin, a top surface and a crown; (d) positioning a hardened ball in said stepped port against a step formed within said stepped port, to seal communication through said stepped port; (e) securing said hardened ball in said port against said step;
   (2) providing a plurality of spherical balls or end members each defining a through-bore with a sidewall and positioned on a second stepped locating pin;
   (3) mounting said second pin and spherical ball assemblies in a second die-casting mold, which second pin securely maintains said ball in position therein;
   (4) die casting a swash plate having a front and rear face in said second mold such that said spherical balls are captured in a complementary socket to form ball/socket connections in said swash plate;
   (5) removing said second locating pin from said throughbore thus providing a counterbore port at the rear face of said swash plate and opening said through-bore for communication between said front and rear faces of said swash plate;
   (6) supporting said piston subassemblies and said swash plate in a holding fixture to align said connecting rods with said through-bores; and
   (7) axially moving said connecting rods into said through-bores to effect the final total length dimension from the rear face of said swash plate to the top surface of said pistons and joining said connecting rod second end to said sidewall of the through-bore.

2. A method as defined in claim 1 such that the length of said connecting rod is centrally located along the length of said through-bore but is maintained at least one-quarter inch into said through-bore.

* * * * *